(12) United States Patent
Ogi

(10) Patent No.: US 6,540,436 B2
(45) Date of Patent: Apr. 1, 2003

(54) DEEP ROOT WATERING UNIT

(75) Inventor: Jeffrey M. Ogi, Aliso Viejo, CA (US)

(73) Assignee: Rain Bird Corporation, Glendora, CA (US)

( * ) Notice: Subject to any disclaimer, the term of this patent is extended or adjusted under 35 U.S.C. 154(b) by 0 days.

(21) Appl. No.: 09/911,138

(22) Filed: Jul. 23, 2001

(65) Prior Publication Data

US 2003/0017001 A1 Jan. 23, 2003

(51) Int. Cl.[7] .............................................. A01G 25/06
(52) U.S. Cl. ........................... 405/45; 405/43; 239/201; 47/48.5
(58) Field of Search ............................. 405/36, 43, 51; 47/48.5, 79, 80, 82; 239/201, 542, 288, 288.3

(56) References Cited

U.S. PATENT DOCUMENTS

| | | | | |
|---|---|---|---|---|
| 3,755,966 A | * | 9/1973 | Smith | 47/48.5 |
| 4,578,897 A | * | 4/1986 | Pazar et al. | 47/48.5 |
| 4,685,827 A | * | 8/1987 | Sibbel | 405/37 |
| 4,697,952 A | * | 10/1987 | Maddock | 405/43 |
| 5,097,626 A | * | 3/1992 | Mordoch | 47/79 |
| 5,761,846 A | * | 6/1998 | Marz | 47/48.5 |
| 5,795,100 A | * | 8/1998 | Thomas et al. | 405/45 |
| 5,809,692 A | * | 9/1998 | Kesler | 47/48.5 |
| 5,924,240 A | * | 7/1999 | Harrison | 47/48.5 |
| 5,956,899 A | * | 9/1999 | DiOrio | 47/80 |
| 5,975,797 A | * | 11/1999 | Thomas et al. | 405/45 |
| 5,996,279 A | * | 12/1999 | Zayeratabat | 47/48.5 |
| 6,161,776 A | * | 12/2000 | Byles | 405/36 |

* cited by examiner

Primary Examiner—Thomas B. Will
Assistant Examiner—Alexandra K. Pechhold
(74) Attorney, Agent, or Firm—Kelly, Bauersfeld Lowry & Kelley, LLP; John D. Bauersfeld (57) ABSTRACT

A deep root watering unit is provided for improved irrigation and aeration of tree roots and the like, particularly with respect to trees planted in non-native or hostile environments such as planters, tree wells in paved areas, clay soils and arid climates. The root watering unit includes a porous sleeve extending downwardly from an upper atrium housing, wherein the watering unit is adapted for in-ground installation adjacent to tree roots or the like. The atrium housing defines a hollow atrium chamber equipped with internal support members for mounting different types of irrigation water dispensing devices, such as a bubbler head or emitter device, for delivering irrigation water downwardly into the porous sleeve and further there through to the adjacent plant roots. A cap grate is removably mounted over the top of the atrium housing to accommodate access to the atrium chamber and the selected water dispensing device mounted therein.

20 Claims, 5 Drawing Sheets

DEEP ROOT WATERING UNIT

BACKGROUND OF THE INVENTION

This invention relates generally to so-called deep root watering devices and systems for improved irrigation and aeration of the roots of relatively large plants such as trees and large shrubs. More particularly, this invention relates to an improved deep root watering unit designed for alternative mounting of selected different irrigation water dispensing devices to achieve custom-tailored delivery of irrigation water to roots of the adjacent plant.

Trees and large shrubs are commonly included as an essential part of an attractive and balanced landscaping plan. However, particularly when planted in non-native or hostile environments, such trees and shrubs may require special irrigation and fertilization in order to achieve a desirably full, healthy and attractive growth. Conversely, improper attention to plant root watering and feeding can often result in a distressed tree or shrub which fails to thrive, is unattractive, and can in some cases fail to survive.

By way of example, trees and large shrubs are commonly planted in non-native or hostile areas, such as within planter boxes, within tree wells located along a paved parkway or roadway or sidewalk surface, within poor quality soils such as clay soils exhibiting poor nutrients and inadequate water permeability and drainage, or within arid climates zones having inadequate precipitation. In such applications, traditional lawn and turf irrigation systems designed primarily for delivering irrigation water over the ground surface to irrigate grass and other shallow-rooted plants have generally proven to be inadequate for proper water delivery to deeper-rooted plants such as trees and large shrubs. As a result, particularly as the surrounding soil becomes compacted typically within a few weeks following initial planting, trees and large shrubs can begin to show evidence of stress attributable to inadequate watering, inadequate delivery of nutrients to the plant roots, and/or inadequate root aeration and drainage.

A variety of specialized deep rootwatering devices and systems have been developed in attempts to provide improved delivery of irrigation water to deep subsurface roots of large plants. In one form, such devices and systems have envisioned one or more porous sleeves or cylinders installed to extend downwardly into the ground in relatively close proximity to the roots of an adjacent tree or the like. Each porous sleeve or cylinder, which may be partially filled with a selected water permeable material such as coarse gravel or the like, provides an essentially open pathway extending from the ground surface to a selected subsurface depth near the deep plant roots requiring irrigation, aeration, and nutrients. Irrigation water can be delivered manually to the interior of the porous sleeve from a bucket or garden hose or the like, or automatically on a scheduled basis by means of an irrigation device mounted within the porous sleeve. In either case, the irrigation water permeates the porous sleeve for substantially direct delivery to the deep plant roots. For one example of such deep root watering system, see U.S. Pat. No. 5,795,100. Deep root watering systems of this general type are also available under the name Rootwell, marketed by Rootwell, Inc. of West Bloomfield, Mich.

Manual water delivery to the deep root watering sleeve requires gardening or maintenance personnel to pay close attention to a regular watering schedule in order to achieve substantially optimized plant health and growth. Unfortunately, in many cases, regular deep watering of trees and large shrubs is often overlooked until these plants start to exhibit signs of stress. Automated watering systems employing an irrigation water dispensing device mounted within each porous deep root watering sleeve are thus preferred, but such automated systems are particularly labor intensive upon installation for proper initial placement of the irrigation device within the porous sleeve.

The present invention provides an improvement upon existing deep root watering devices and systems utilizing an irrigation dispensing device for automated delivery of irrigation water to the interior of a deep root porous sleeve, wherein the invention accommodates quick and easy proper installation of selected alternative irrigation dispensing devices within the deep root porous sleeve.

SUMMARY OF THE INVENTION

In accordance with the invention, an improved deep root watering unit is provided for irrigation and aeration of tree roots and the like, particularly with respect to trees planted in non-native or hostile environments such as planters, tree wells in paved areas, clay soils and arid climates. The root watering unit comprises an upper atrium housing mounted at the upper end of a downwardly extending porous sleeve adapted for in-ground installation adjacent to tree roots or the like. The atrium housing includes internal support members for mounting selected different types of irrigation water dispensing devices, such as a bubbler head or emitter device, for delivering irrigation water downwardly into the porous sleeve and further there through to the adjacent plant roots.

In a preferred form, the atrium housing has a generally cylindrical shape defining a hollow interior atrium chamber. The internal support members are positioned within the atrium chamber. In a preferred configuration, the internal support members include at least one open support collar for receiving and support a riser tube having a water dispensing device such as a bubbler head mounted at an upper end thereof, and at least one detent seat or pocket for snap-fit reception and support of flexible tubing having a water dispensing device such as an emitter device mounted thereon. These internal support members are formed as portions of a perforated shelf within the atrium chamber at a location recessed below an upper end of the atrium housing. A lower end of the atrium housing defines a downwardly open annular channel for slide-fit and preferably snap-fit assembly with an upper end of the porous sleeve.

The assembled atrium housing and porous sleeve are installed in the ground in selected close proximity to the roots of a tree or large shrub, with an upper end of the atrium housing positioned substantially at or near ground level. An irrigation conduit extends into the hollow interior of the porous sleeve, as by passage through a lateral opening formed in the porous sleeve, for suitable connection to the selected irrigation water dispensing device which is supported in turn within the atrium housing by the appropriate support member therein. A cap grate is removably mounted over the top of the atrium housing to accommodate access to the atrium chamber and the selected water dispensing device mounted therein.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figures 1, 2:
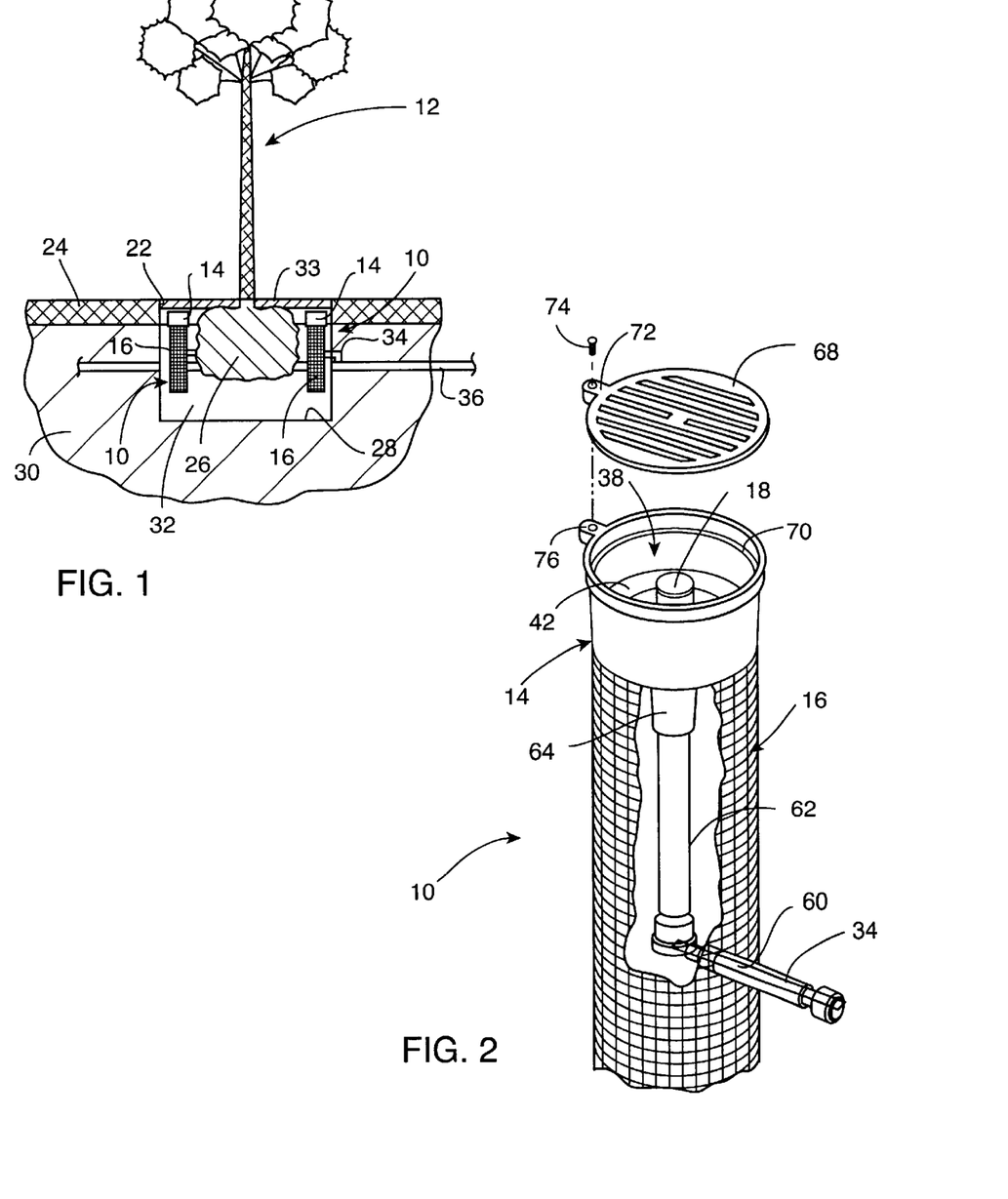
FIG. 1 is a vertical sectional view showing a tree planted along a paved parkway or sidewalk or the like, with a pair of deep root watering units in accordance with the invention for irrigating the roots of the tree.
FIG. 2 is an enlarged, fragmented, and partially exploded perspective view showing one of the deep root watering units of FIG. 1 including a bubbler-type irrigation head in accordance with one preferred form of the invention, with portions broken away to illustrate construction details thereof.
Figure 3:
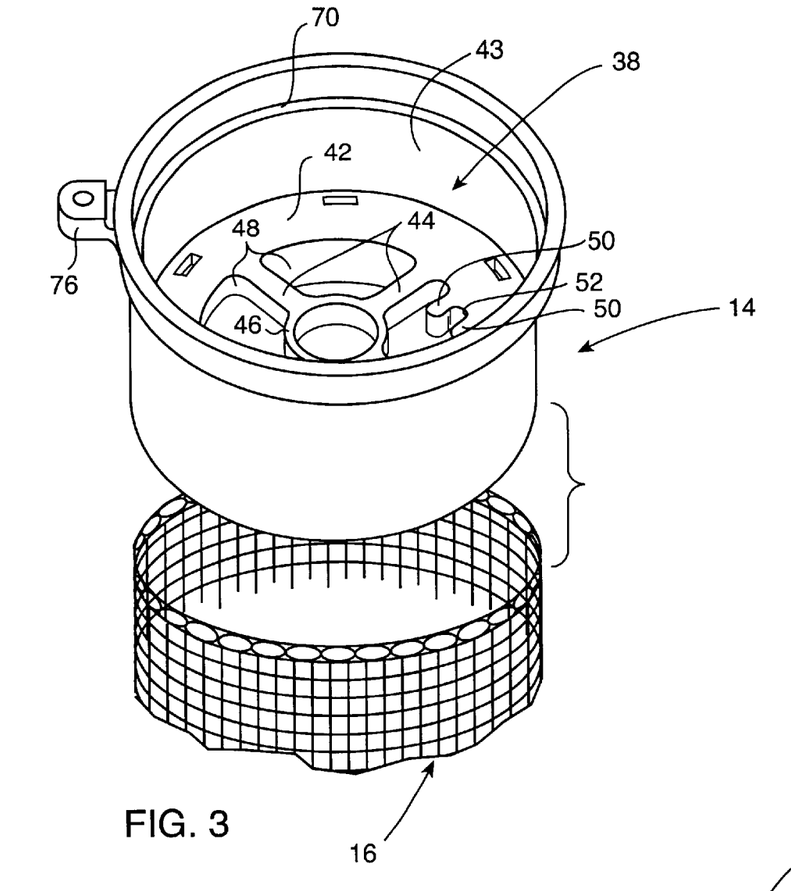
FIG. 3 is a further enlarged and exploded fragmented perspective view showing mounting of an upper atrium housing of the deep root watering unit onto a downwardly extending porous sleeve.
Figure 4:
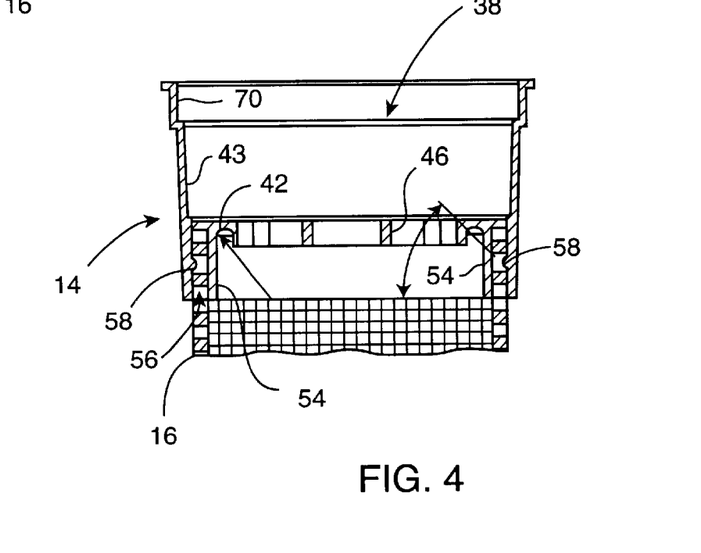
FIG. 4 is a fragmented vertical sectional view taken generally on the line 4—4 of FIG. 3, a illustrating the atrium housing and porous sleeve in assembled relation.

As shown in the exemplary drawings, an improved deep root watering unit referred to generally by the reference numeral 10 is provided for deep root watering of a tree 12 or large shrub or the like as viewed in FIG. 1. The root watering device 10 generally comprises an upper atrium housing 14 mounted at an upper end of an elongated and downwardly extending porous sleeve 16, wherein the atrium housing 14 is equipped with internal support means or members for mounting different types of irrigation water dispensing devices, such as a bubbler head 18 (FIGS. 2 and 5) or an emitter or dripper device 20 (FIGS. 6–7), selected for delivering irrigation water downwardly into the porous sleeve and further there through to the adjacent plant roots.

The deep root watering unit 10 of the present invention is particularly designed for use with trees and large shrubs planted in non-native or hostile areas, such as within planter boxes, within tree wells located along a paved parkway or roadway or sidewalk surface, within poor quality soils such as clay soils exhibiting poor nutrients and inadequate water permeability and drainage, or within arid climates zones having inadequate precipitation. By way of example, FIG. 1 illustrates a tree 12 planted within an opening or cut-out 22 formed in a paved surface 24, such as a parkway or sidewalk. As shown, the tree 12 includes a root ball 26 placed within a well or hole 28 dug into the natural soil 30, wherein this hole is typically backfilled with a selected planting soil medium 32 which often incorporates sand or other water permeable constituents. A ground cover layer 33 of humus material such as bark chips or the like is commonly provided on top of the planting soil medium 32.

The deep root watering unit 10 is mounted individually or in groups of two or more in relatively close association with the tree roots 26 to provide irrigation, aeration, and facilitated delivery of nutrients in a manner conducive to substantially optimized plant development and health. FIG. 1 shows a pair of the root watering units 10 installed in the ground generally on opposite sides of the root ball 26. These watering units 10 may be installed at the time of initial planting, typically prior to backfilling the hole 28 with the planting soil medium 32, or subsequently by placing the watering units 10 into vertically elongated holes of selected depth. As shown, each watering unit 10 is coupled via a short branch conduit 34 to an underground irrigation water supply line 36. In accordance with an important aspect of the invention, each root watering unit 10 of the present invention is designed for facilitated assembly with any selected one of multiple different irrigation water dispensing devices, without requiring additional or alternative component parts. With this construction, the improved watering unit 10 can be installed quickly and easily to provide custom-tailored delivery of irrigation water to a particular plant or group of plants.

The upper atrium housing 14 of the improved root watering unit 10 is shown in more detail in FIGS. 2–7. As shown, the illustrative atrium housing 14 has a generally cylindrical canister-like shape which can be formed conveniently and economically from molded plastic or the like. The atrium housing 14 defines an interior and substantially hollow or open atrium chamber 38 having a generally centrally located perforated shelf formed therein. This perforated shelf comprises an outer annular ledge 42 which projects radially inwardly a short distance from a cylindrical outer wall 43 of the atrium housing, and is joined to a plurality of inwardly radiating and relatively thin spokes 44 which terminate at and support a coaxially centrally positioned support collar 46 forming one of the support members for a selected irrigation water dispensing device, as will be described in more detail. Importantly, the spokes 44 are separated from each other by a corresponding plurality of relatively large open ports 48 permitting substantially unobstructed downward water flow there through. At least one of these flow ports 48 is lined along a side edge thereof by a spaced-apart pair of short fingers 50 defining a detent seat or pocket 52 there between, wherein this detent seat 52 comprises another one of the support members for an irrigation water dispensing device.

The annular ledge 42 of the perforated shelf additionally supports a downwardly extending annular flange 54 (FIG. 4) spaced radially inwardly a short distance from the housing wall 43 and formed generally concentric therewith. This annular flange 54 cooperates with a lower segment of the housing wall 43 to define a downwardly open annular channel 56 (FIG. 4) having a size and shape for close-fit sliding reception of an upper marginal end of the porous sleeve 16. In this regard, the porous sleeve 16 is also formed from a plastic or plastic-based material and is shown in the form of an elongated hollow and open mesh sleeve member or structure having a cylindrical shape of selected length and a size for press-fit reception into the channel 56 at the underside of the atrium housing 14. Short retention teeth 58 may be formed to project radially inwardly from the housing wall 43 for snap-fit engagement into mesh openings formed in the porous sleeve 16 for releasibly retaining the components in assembled relation.

The assembled atrium housing 14 and porous sleeve 16 are installed into the ground (as viewed in FIG. 1), at the selected location in relatively close proximity to the roots 26 of an associated tree 12 or the like, with the atrium housing 14 having its upper end disposed substantially at or near ground level. In this position, the porous sleeve 16 extends downwardly from the atrium housing 14 to define an essentially open subterranean pathway adjacent the plant roots. If desired, the interior of the porous sleeve 16 may be filled with a water permeable filler material such as gravel or the like (not shown). The selected irrigation water dispensing device quickly and easily mounted within the atrium housing 14, and appropriately coupled to the water supply line 36.

Figure 5:
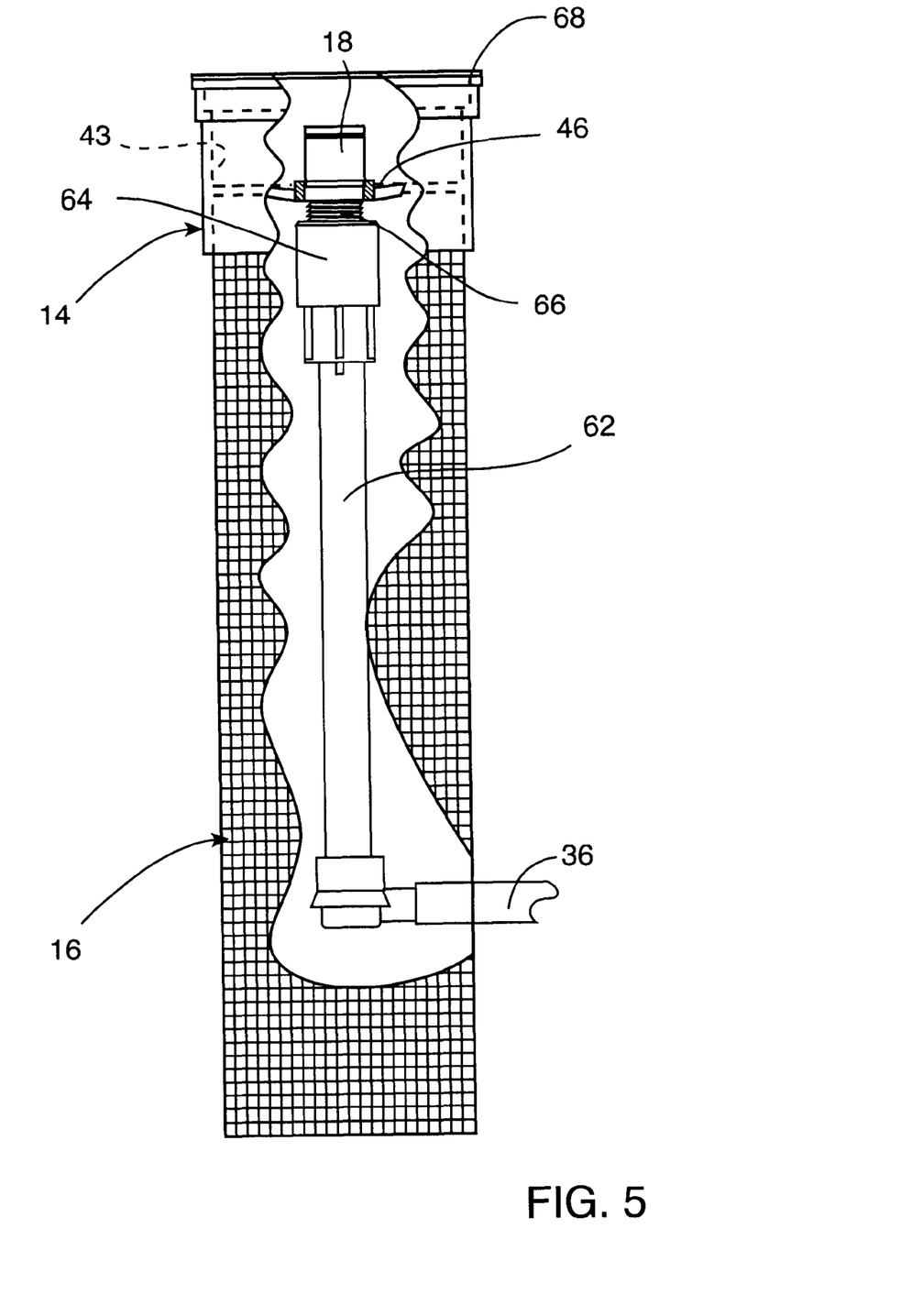
FIG. 5 is a front elevation view of the deep root watering unit of FIG. 2, with portions broken away to illustrate construction details thereof.

More particularly, the central support collar 46 within the atrium housing 14 provides a first support member for receiving and supporting an irrigation dispensing device such as the bubbler head 18, as viewed in FIGS. 2 and 5. The branch conduit 34 coupled to the water supply line 36 is fitted into the interior of the porous sleeve 16, as by passage through a small lateral opening 60 shown in FIG. 2. This branch conduit 34 is coupled in turn to a riser tube 62 extending upwardly within the porous sleeve 16 and connected at its upper end to a check valve 64 positioned below the support collar 46. A short threaded nipple 66 (FIG: 5) extends upwardly from the check valve 64 through the support collar 46 and has the bubbler head 18 or other selected type of irrigation device securely mounted thereon at a position above the support collar 46.

Figure 6:
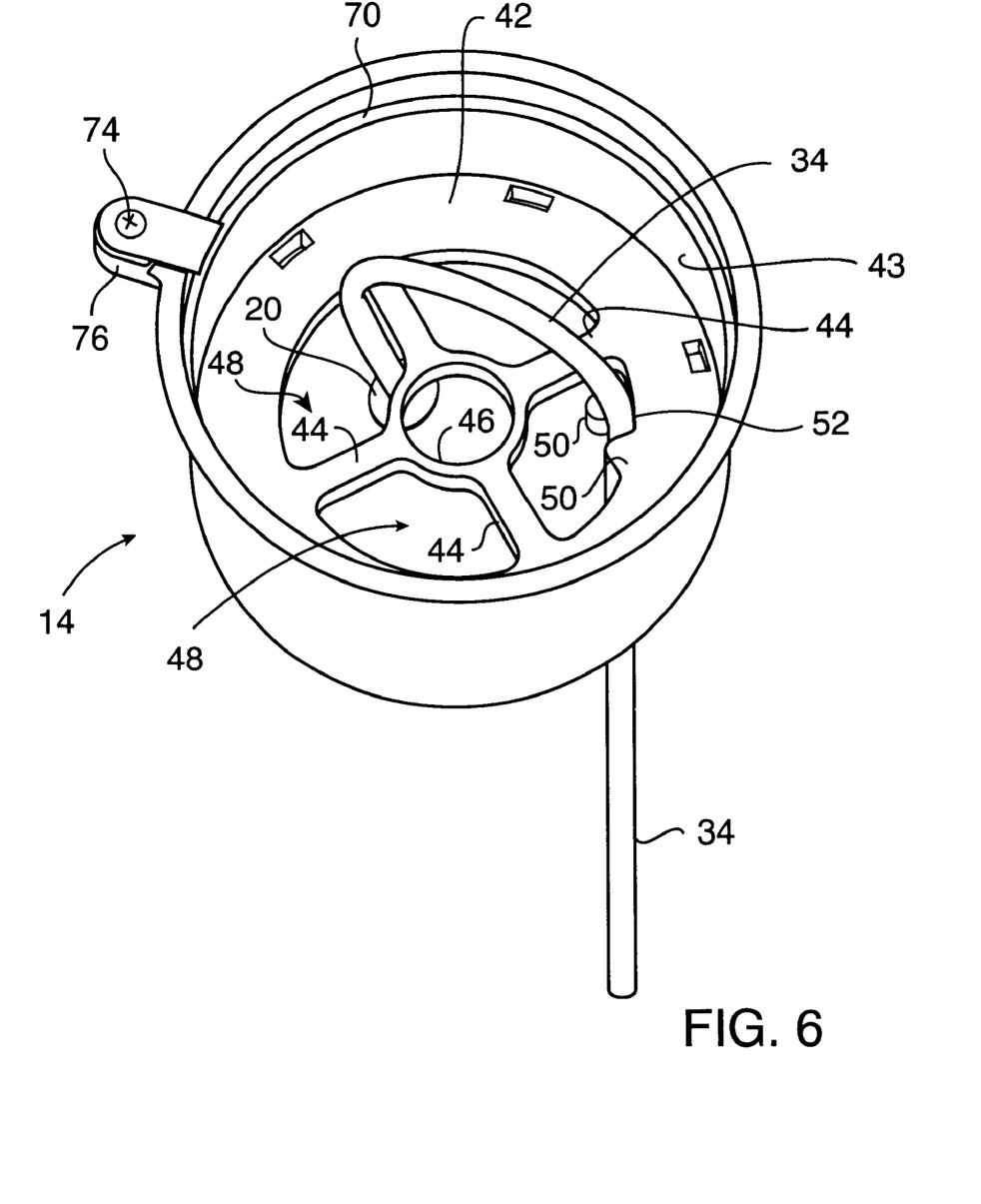
FIG. 6 is a perspective view of the atrium housing assembled with a dripper-type irrigation head in accordance with an alternative preferred form of the invention.
Figure 7:
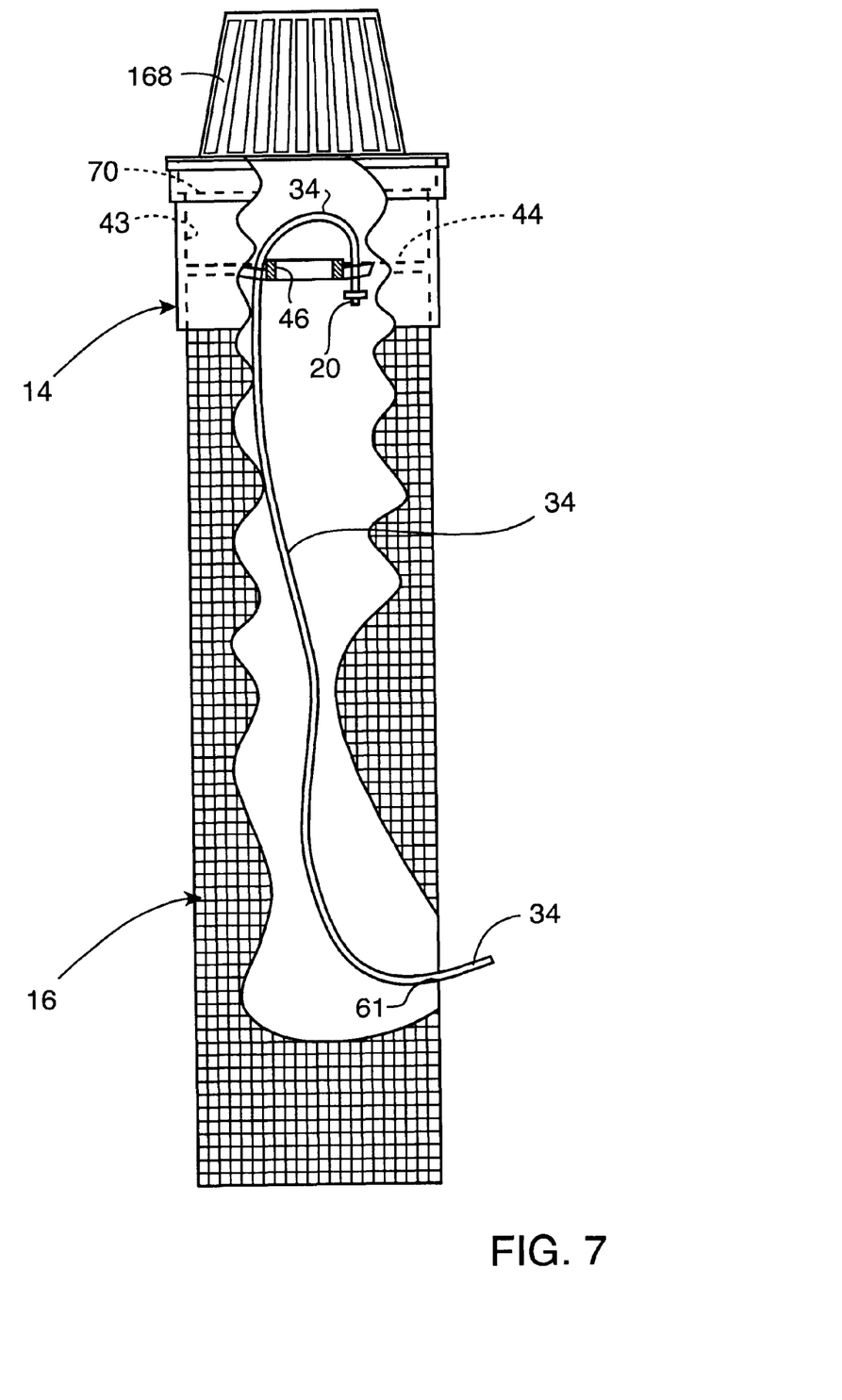
FIG. 7 is a front elevation view of the deep root watering device, similar to FIG. 5, and illustrating the alternative form including the dripper-type irrigation head.

The detent seat 52 within the atrium housing 14 provides a second or alternative support member for receiving and supporting an irrigation dispensing device such as the emitter device 20, as viewed in FIGS. 6 and 7. In this configuration, the branch conduit 34 comprises a flexible length of tubing having one end coupled in a suitable manner to the water supply line 36, and an opposite end fitted into the interior of the porous sleeve 16 as by extending through a small opening 61 (FIG. 7). This length of tubing 34 then extends upwardly within the porous sleeve 16 and is snap-fit retained within the detent seat 52 defined by the spaced-apart pair of fingers 50 (as shown best in FIG. 6). In a preferred geometry, the detent seat 52 is formed with a slightly narrowed opening defined between the two fingers 50 for snap-fit reception of the tubing, wherein this opening expands slightly toward a base of the detent for secure tubing retention without significant crimping. From the detent seat 52, the flexible tubing 34 extends to a position above the perforated shelf and carries the emitter or dripper device 20 or other selected water dispensing device. FIGS. 6–7 show the end of the tubing 34 with the emitter device 20 thereon loosely draped downwardly through one of the open ports 48 defined between the radial spokes 44.

In either configuration, the atrium housing 14 supports the irrigation water dispensing device such as the bubbler head 18 or the emitter device 20 in a secure and stable, and easily assembled manner. The irrigation system can be separately controlled to deliver water to the atrium housing on a prescribed schedule for appropriate, substantially optimized watering of the associated plant. The water falls freely within the interior of the open column defined by the underlying porous sleeve 16, through which the water can pass relatively freely into association with the plant roots. In addition, if and when desired, supplemental plant watering can be performed manually by pouring water into the open upper end of the atrium housing 14, or by adding water by means of a garden hose or the like. In either case, the water again flows substantially without obstruction to the interior of the underlying porous sleeve, and further the adjacent plant roots.

A cap grate 68 is also provided for removably capping and closing the upper end of the atrium housing 14. As shown in FIGS. 2 and 5, this cap grate 68 may comprises a perforated flat plate adapted for nested reception into the upper end of the atrium housing 14 seated upon an annular inner shoulder 70 formed therein. In an alternative configuration, a raised or domed perforated cap grate 168 can be provided as shown in FIG. 7. In either embodiment, the cap grate 68 or 168 conveniently includes a ported tab 72 at the periphery thereof for connection by a screw 74 or other selected fastener means into a threaded tab 76 formed at the upper end of the atrium housing. With this construction, the cap grate 68 or 168 can be securely fastened onto the atrium housing for normally preventing access to the chamber 38 therein, but can be removed relatively quickly and easily for access to the irrigation device mounted within the atrium chamber 38.

The improved deep root watering unit 10 of the present invention thus provides a relatively simple and easily assembled structure for receiving and supporting a selected irrigation water dispensing device chosen from multiple different types of irrigation dispensing devices. The root watering unit 10 can thus be custom-configured in a manner to achieve substantially optimized irrigation of the associated plant for substantially optimized healthy plant development. In addition, by providing an open subterranean pathway in close proximity to the plant roots, the watering unit 10 assists in desirable root aeration and further facilitates the delivery of fertilizer and other nutrients substantially directly to the plant roots.

A variety of further modifications and improvements in and to the improved deep root watering device of the present invention will be apparent to those persons skilled in the art. As one example, it will be recognized and understood that the cylindrical porous sleeve 16 may comprise an elongated hollow cylinder having water flow openings formed therein in one or more selected regions thereof. Moreover, while the atrium housing 14 and the associated porous sleeve 16 assembled therewith are shown and described to have a generally cylindrical configuration with a generally circular cross sectional shape, it will be appreciated that these components may have alternative geometric shapes, i.e., a rectangular or other suitable cross sectional shape. Accordingly, no limitation on the invention is intended by way of the foregoing description and accompanying drawings, except as set forth in the appended claims.

What is claimed is:

1. A deep root watering unit comprising
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant;
an atrium housing mounted at an upper end of said sleeve member, said atrium housing defining an internal atrium chamber, and further including a plurality of support members within said atrium chamber for supporting a selected one of multiple different types of irrigation water dispensing devices; and
a cap grate removably mounted on an upper end of said atrium housing wherein said cap grate is perforated.

2. The deep root watering unit of claim 1 further including fastener means for removably fastening said cap grate to said atrium housing.

3. A deep root watering unit of comprising
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant;

an atrium housing mounted at an upper end of said sleeve member, said atrium housing defining an internal atrium chamber, and further including a plurality of support members within said atrium chamber for supporting a selected one of multiple different types of irrigation water dispensing devices; wherein said plurality of support members within said atrium chamber comprises a support collar for receiving and supporting a first type of water dispensing device, and a detent seat for receiving and supporting a second type of water dispensing device; and further including a plurality of spokes projecting inwardly from an interior wall of said atrium housing, said spokes having their inner ends connected to and supporting said support collar, said spokes being disposed in spaced-apart relation to define a plurality of vertically open flow ports formed there between.

4. The deep root watering unit of claim 3 further including a riser tube extending generally vertically within said sleeve member with an upper end of said riser tube aligned generally with said support collar, and an irrigation water dispensing device mounted at said riser tube upper end and positioned above said support collar, at least one of said riser tube and said dispensing device extending through and being supported by said support collar.

5. The deep root watering unit of claim 4 further including a water supply conduit connected to a lower end of said riser tube.

6. The deep root watering unit of claim 3 wherein said detent seat is defined by a pair of fingers extending in spaced-apart relation into one of said open flow ports formed between an adjacent pair of said spokes.

7. The deep root water in unit of claim 6 further including a length of flexible tubing extending generally vertically within said sleeve member and retained near an upper end thereof within said detent seat, and an irrigation water dispensing device mounted at said flexible tubing upper end.

8. The deep root watering unit of claim 7 further including a water supply conduit connected to a lower end of said flexible tubing.

9. A deep root watering unit comprising
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant; and
an atrium housing mounted at an upper end of said sleeve member, said atrium housing defining an internal atrium chamber, and further including a plurality of support members within said atrium chamber for supporting a selected one of multiple different types of irrigation water dispensing devices; wherein said atrium housing further defines a downwardly open channel for slide-fit reception of said sleeve member upper end; and
wherein said atrium housing further includes tooth means for retaining said sleeve member upper end within said channel.

10. A deep root watering unit, comprising:
an elongated and porous hollow sleeve member adapted for in-ground placement to extend generally vertically at a position adjacent roots of a selected plant;
an atrium housing mounted at an upper end of said sleeve member and defining an internal atrium chamber, said atrium housing further including a first support member within said atrium chamber for supporting a first type of irrigation water dispensing device, and a second support member within said atrium chamber for alternatively supporting a second type of irrigation water dispensing device; and
a cap grate removably mounted on an upper end of said atrium housing wherein said cap grate is perforated.

11. A deep root watering unit, comprising:
an elongated and porous hollow sleeve member adapted for in-ground placement to extend generally vertically at a position adjacent roots of a selected plant;
an atrium housing mounted at an upper end of said sleeve member and defining an internal atrium chamber, said atrium housing further including a first support member within said atrium chamber for supporting a first type of irrigation water dispensing device, and a second support member within said atrium chamber for alternatively supporting a second type of irrigation water dispensing device;
a cap grate removably mounted on an upper end of said atrium housing wherein said first support member comprises a support collar for receiving and supporting said first type of water dispensing device, and said second support member comprises a detent seat for receiving and supporting said second type of water dispensing device; and
further including a plurality of spokes projecting inwardly from an interior wall of said atrium housing, said spokes having their inner ends connected to and supporting said support collar, said spokes being disposed in spaced-apart relation to define a plurality of vertically open flow ports formed there between.

12. The deep root watering unit of claim 11 further including a riser tube extending generally vertically within said sleeve member with an upper end of said riser tube aligned generally with said support collar, said first type of dispensing device being mounted at said riser tube upper end and positioned above said support collar; at least one of said riser tube and said dispensing device extending through and being supported by said support collar.

13. The deep root watering unit of claim 11 wherein said detent seat is defined by a pair of fingers extending in spaced apart relation into one of said open flow ports formed between an adjacent pair of said spokes.

14. The deep root watering unit of claim 13 further including a length of flexible tubing extending generally vertically within said sleeve member and retained near an upper end thereof within said detent seat, said second type of water dispensing device mounted at said flexible tubing upper end.

15. A deep root watering unit, comprising:
an elongated and porous hollow sleeve member adapted for in-ground placement to extend generally vertically at a position adjacent roots of a selected plant;
an atrium housing mounted at an upper end of said sleeve member and defining an internal atrium chamber, said atrium housing further including a first support member within said atrium chamber for supporting a first type of irrigation water dispensing device, and a second support member within said atrium chamber for alternatively supporting a second type of irrigation water dispensing device;
a cap grate removably mounted on an upper end of said atrium housing wherein said atrium housing further defines a downwardly open channel for slide-fit reception of said sleeve member upper end; and wherein said atrium housing further includes tooth means for retaining said sleeve member upper end within said channel.

16. In a deep root watering unit including an elongated porous hollow sleeve member adapted for in-ground placement to extend generally vertically at a position adjacent roots of a selected plant, and an atrium housing mounted at an upper end of said sleeve member and defining an internal atrium chamber, the improvement comprising:

a first support member within said atrium chamber for supporting a first type of irrigation water dispensing device, and a second support member within said atrium chamber for alternatively supporting a second type of irrigation water dispensing device wherein said first support member comprises a support collar for receiving and supporting said first type of water dispensing device, and said second support member comprises a detent seat for receiving and supporting said second type of water dispensing device; and further including a plurality of spokes projecting inwardly from an interior wall of said atrium housing, said spokes having their inner ends connected to and supporting said support collar, said spokes being disposed in spaced-apart relation to define a plurality of vertically open flow ports formed there between.

17. The deep root watering unit of claim 16 further including a riser tube extending generally vertically within said sleeve member with an upper end of said riser tube aligned generally with said support collar, said first type of dispensing device being mounted at said riser tube upper end and positioned above said support collar, at least one of said riser tube and said dispensing device extending through and being supported by said support collar.

18. The deep root watering unit of claim 16 wherein said detent seat is defined by a pair of fingers extending in spaced-apart relation into one of said open flow ports formed between an adjacent pair of said spokes.

19. The deep root watering unit of claim 18 further including a length of flexible tubing extending generally vertically within said sleeve member and retained near an upper end thereof within said detent seat, said second type of water dispensing device mounted at said flexible tubing upper end.

20. In a deep root watering unit including an elongated porous hollow sleeve member adapted for in-ground placement to extend generally vertically at a position adjacent roots of a selected plant, and an atrium housing mounted at an upper end of said sleeve member and defining an internal atrium chamber, the improvement comprising:

a first support member within said atrium chamber for supporting a first type of irrigation water dispensing device, and a second support member within said atrium chamber for alternatively supporting a second type of irrigation water dispensing device wherein said atrium housing further defines a downwardly open channel for slide-fit reception of said sleeve member upper end; and wherein said atrium housing further includes means for retaining said sleeve member upper end within said channel.

* * * * *